United States Patent [19]

Blechinger et al.

[11] Patent Number: 5,119,201
[45] Date of Patent: Jun. 2, 1992

[54] LINE CAMERA FOR IMAGING OBJECT STRIPS ON PHOTOSENSITIVE DETECTOR LINES

[75] Inventors: Fritz Blechinger; Michael Hofmann, both of Munich, Fed. Rep. of Germany

[73] Assignee: Messerschmitt-Bolkow-Blohm GmbH, Fed. Rep. of Germany

[21] Appl. No.: 559,698

[22] Filed: Jul. 30, 1990

[30] Foreign Application Priority Data

Aug. 17, 1989 [DE] Fed. Rep. of Germany ....... 3927158

[51] Int. Cl.⁵ .............................................. H04N 5/30
[52] U.S. Cl. ................... 358/209; 358/109; 358/55
[58] Field of Search ................. 358/55, 109, 225, 209, 358/208, 206; 354/110, 65

[56] References Cited

U.S. PATENT DOCUMENTS

| | | | |
|---|---|---|---|
| 3,240,138 | 3/1966 | Goddard | 354/65 |
| 3,796,826 | 3/1974 | Kerr | 358/225 |
| 3,808,361 | 4/1974 | Hofmann | 358/55 |
| 4,477,829 | 10/1984 | Ziman et al. | 358/1 |

Primary Examiner—Howard W. Britton
Assistant Examiner—Tuan V. Ho
Attorney, Agent, or Firm—Evenson, Wands, Edwards, Lenahan & McKeown

[57] ABSTRACT

The invention relates to a line camera for imaging object strips on photosensitive detector lines, having an objective producing a line image of an object strip, having a ray deflecting system situated at the site of the line image by which the line image is divided into adjacent image sections, in such a manner that paths of the rays pertaining to adjacent image sections are deflected into respective different directions in space. One optical relay system respectively is optically arranged behind each image section for the imaging of the respective image section on its own respective detector line. The total number of optical relay systems is divided into at least two groups, each group being assigned to a different direction in space. The optical relay systems of each individual group image the image sections assigned to them in a respective joint focal plane on their respective own detector lines, which, in the respective focal plane, are arranged above one another in a line directed parallel with respect to the line image. One aperture is arranged respectively between each detector line and the optical relay system assigned to it.

4 Claims, 5 Drawing Sheets

LINE CAMERA FOR IMAGING OBJECT STRIPS ON PHOTOSENSITIVE DETECTOR LINES

BACKGROUND OF THE INVENTION

The invention relates to a line camera for imaging object strips on photosensitive detector lines, having an objective producing a line image of an object strip, having a ray deflecting system situated at the site of the line image by means of which the line image is divided into adjacent image sections in such a manner that paths of the rays pertaining to adjacent image sections are directed into respective different directions in space, as well as having an optical relay system arranged optically behind each image section for imaging the respective image section on a respective separate detector line.

A line camera of this type is known from the German patent document DE-AS 21 06 268. A method is described a picture of an object by means of line-by-line imaging from a stable-position missile flying over the object. The missile carries a camera which images object strips of the object, specifically ground strips of the surface of the earth, by means of an objective, first in its focal plane, as a line image. At the site of this line image, a ray deflecting system is situated which is composed of two mirror strips which abut one another in the longitudinal direction of the line image and by means of which the line image is divided into two image sections. The paths of the rays which pertain to these two image sections are deflected into two different directions in space by the mirror strips which are oriented in a different manner. Two optical relay systems are optically arranged behind the ray deflecting system and are each assigned to one of the two image sections respectively. These optical relay systems each plot a line-shaped image of the respective image sections on their own separate detector.

This known line camera is obviously designed only for relatively small image angles and is to be operated predominantly in the visible spectral range. It is therefore an object of the invention to provide a line camera of the initially mentioned type which, at the same time, is suitable for a very large viewing angle range (for example, approximately 110°) and for a full use in the infrared spectral range.

In the case of a very wide-angle take of ground strips, naturally very long line images will be created, and therefore correspondingly long detector lines would normally have to be used. Although these exist for the visible spectral range (according to the magnitude, 6,000 detector elements with an overall length of 6 cm), no sufficiently long detector lines are available yet for the infrared spectral range. In addition, problems exist when there is the attempt to take along line image by stringing together individual detector lines, because at points where the lines abut, losses of information will occur. The production of a long detector line for the infrared range by placing together several short detector lines while avoiding any gaps is very expensive.

However, also if a single, very long detector line were to be used, additional problems would occur in the infrared range which are a result of the fact that this detector line must be effectively shielded from any type of interference irradiation. For this purpose, an aperture is arranged in front of the detector line in the path of the rays which, like the whole housing containing the detector line and the aperture, must be cooled to temperatures that are as low as possible. This results in considerable additional expenditures with respect to equipment as well as in considerable additional operating costs.

According to the invention, the above-mentioned object is achieved by means of an arrangement wherein the total number of the optical relay systems is divided into at least two groups, each group being assigned to another direction in space, the optical relay systems of each individual group each imaging the image sections assigned to them in a common focal plane on their respective separate detector lines which are arranged above one another in the respective focal plane in a line directed in parallel to the line image, and one screen respectively being arranged between each detector line and the respective optical relay system assigned to it.

Other objects, advantages and novel features of the present invention will become apparent from the following detailed description of the invention when considered in conjunction with the accompanying drawings.

DESCRIPTION OF THE DRAWINGS

Figure 1:
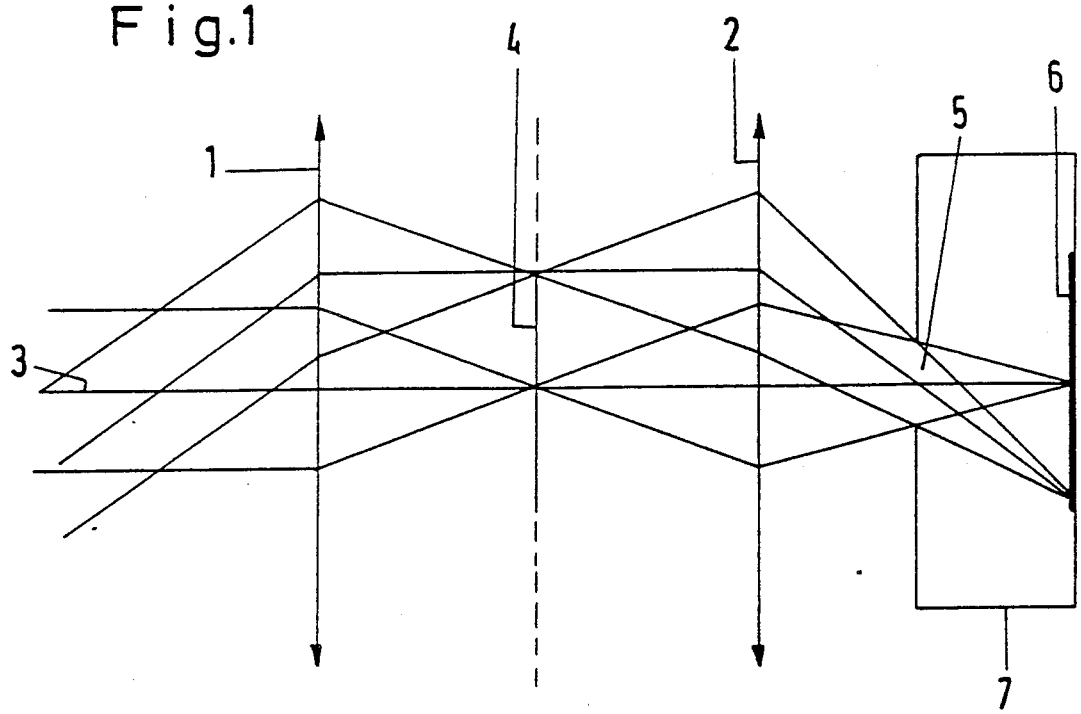
FIG. 1 schematically depicts a system with problems that the present invention is directed toward solving.

The problem that the invention is directed toward solving is graphically depicted in FIG. 1. An optical path of the rays is illustrated there which, as the optical elements, comprises an objective 1, an optical relay system 2, a screen 5 as well as a long detector line 6. Because of the wide-angle take, a correspondingly long line image 4 of a (not shown) object strip is plotted in the focal plane of the objective 1. The optical relay system 2, which follows, plots a picture of this line image 4 on detector line 6. Between the optical relay system 2 and the detector line 6, a screen 5 is arranged in the path of the rays which represents an opening in a housing 7, at the interior rear wall of which the detector line 6 is arranged. In order to shield the detector line from interfering infrared radiation, the whole housing 7 must be cooled. Since only a single long detector line 6 exists, the opening of the aperture 5 must also have corresponding dimensions and its distance to the detector line must be correspondingly large which, in turn, has an effect on the dimensions of the housing 7. The aperture 5 is mounted in the path of the rays between the optical relay system 2 and the detector line 6 in such a manner that a path of the rays is created which, with respect to the optical relay system 2, is telecentric on the object side and, with respect to the objective 1, is telecentric on the image side.

Figure 2:
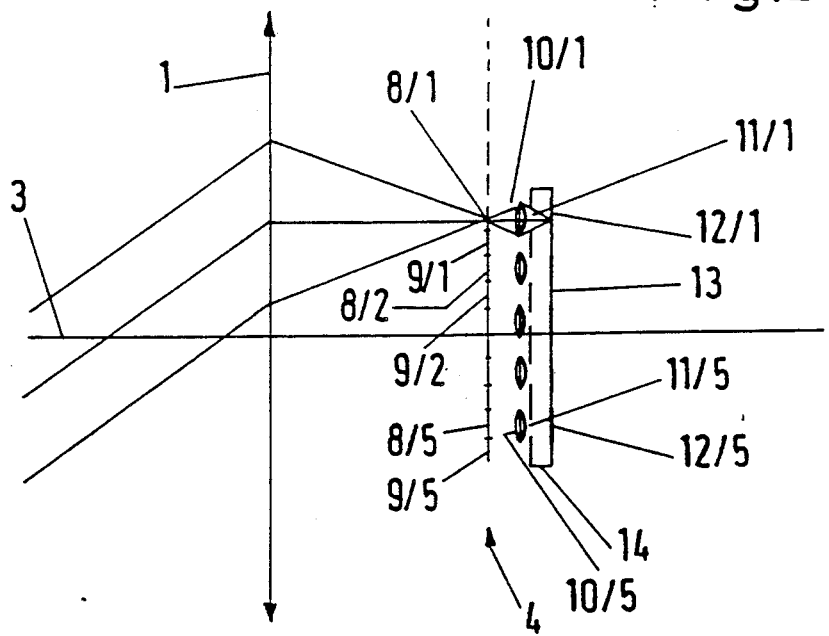
FIG. 2 is a schematic view of the principle of the invention.

It is illustrated schematically in FIG. 2 how the line image 4 plotted by the objective 1 is divided into a number of abutting linear image sections 8/1, 9/1 to 8/5, 9/5. This division takes place by means of a ray deflecting system (which is not shown here) which deflects the path of the rays pertaining to the image sections 8/1 to 8/5 into one direction in space, specifically that shown in FIG. 2, and which deflects the path of the rays pertaining to image sections 9/1 to 9/5 into another direction in space which is not shown in FIG. 2. Five optical relay systems 10/1 to 10/5 are arranged optically behind the image sections 8/1 to 8/5 and image the respective image sections on their respective separate detector lines 12/1 to 12/5.

Between the optical relay systems 10/1, etc., and the pertaining detector lines 12/1, etc. respective screens 11/1 are arranged in such a manner that the telecentric path of the rays is obtained again which was mentioned above and the use of which, specifically in the present case, is particularly advantageous. The reason is that it has the result that a cone of rays which is used for imaging a ground point in the focal plane of the objective 1 and which is shown as coming from the left in FIG. 2 stands perpendicularly on the focal plane and therefore continues also perpendicularly in the direction of the optical relay system 10/1 so that the paths of the rays assigned to the optical relay systems 10/1, etc. do not move apart but are narrowly adjacent to one another which, in turn, has the result that the individual detector lines 12/1, etc. are disposed relatively near one another.

The optical relay systems 10/1 to 10/5 form one group., and the optical relay systems assigned to image sections 9/1 to 9/5 and not shown form a second group, in which case, these two groups of optical relay systems, with respect to their paths of the rays, are each assigned to different directions in space. The paths of the rays of the optical relay systems of one group, for example, optical relay systems 10/1 to 10/5, all point to the same direction in space. Image sections 8/1 to 8/5, which are assigned to optical relay systems 10/1 to 10/5, are imaged in a common focal plane 13, specifically on their respective own detector lines 12/1 to 12/5 which, in the common focal plane 13, are arranged above one another in a line directed in parallel to the line image 4.

As illustrated in FIG. 2, in the arrangement according to the invention, the now relatively small screens 11/1 to 11/5, in comparison to the arrangement according to FIG. 1, are disposed very closely in front of the respective assigned detector lines 12/1 to 12/5. This results in a considerable reduction in size of the housing 14 containing the screens 11/1 to 11/5 as well as the detector lines 12/1 to 12/5. The cooling expenditures for the cooling of this housing are reduced considerably. This is also still true if it is taken into account that, for the image sections 9/1 to 9/5, a second group of (not shown) optical relay systems is required which have a housing with the corresponding screens and detector lines which is analogous to the housing 14 and which must also be cooled. In the final analysis, the required cooling expenditures are considerably lower than in the case of an arrangement according to FIG. 1. In addition, relatively short detector lines may be used which are commercially available for the infrared range without any problems and which, on the whole, are much less expensive than a correspondingly long detector line which is to be manufactured specifically for this purpose.

Figure 3:
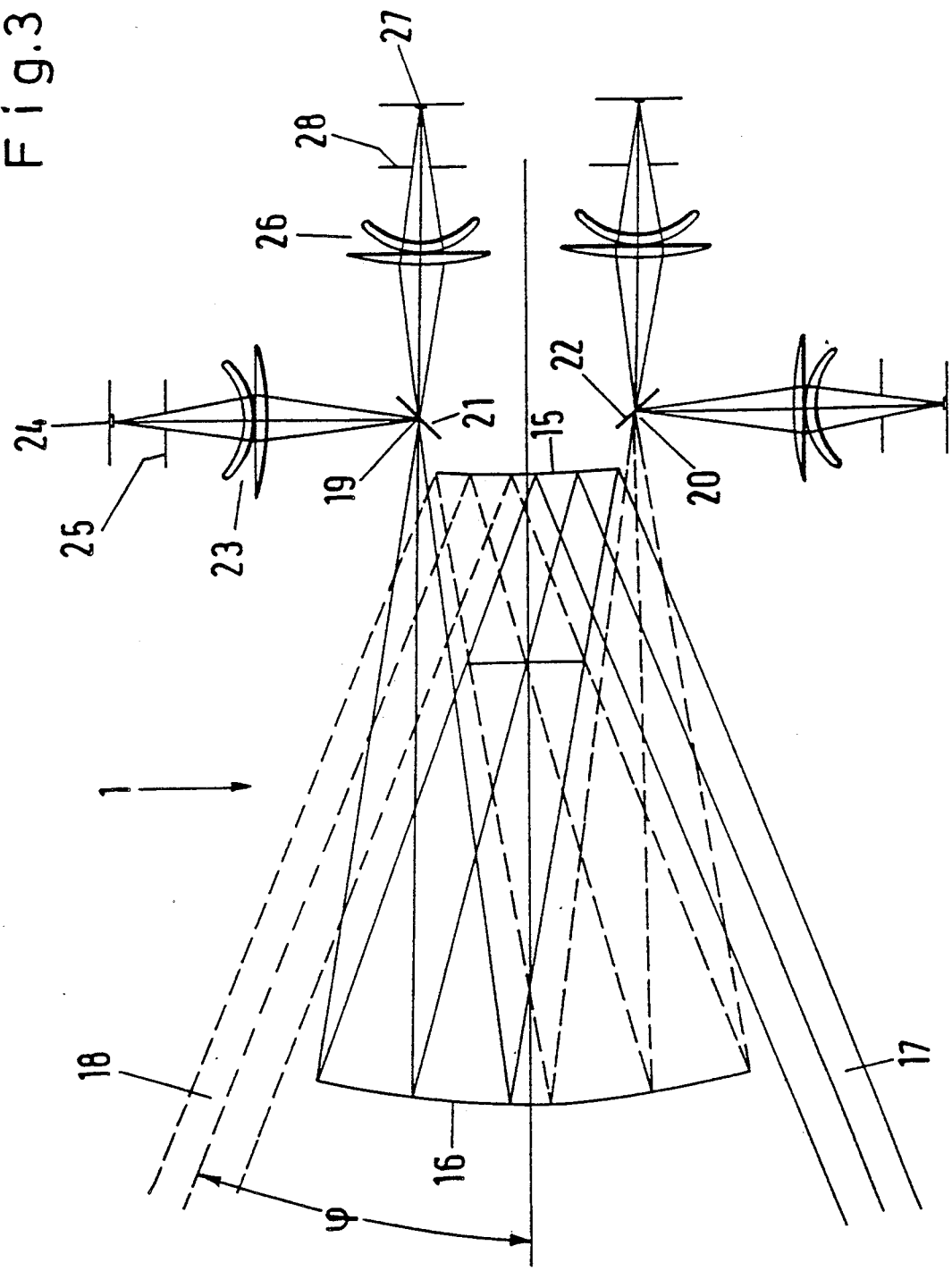
FIG. 3 is a schematic view of an embodiment of the invention for the simultaneous imaging of two object strips.

FIG. 3 illustrates the essential elements of a line camera by means of which two object strips may be imaged simultaneously. Objective 1 comprises two curved, non-spherical, particularly ellipsoid-shaped mirrors, specifically a convex primary mirror 15 and a concave secondary mirror 16. This is therefore an obliquely mirroring system. The two ground strips, which are not shown, extend perpendicularly with respect to the drawing plane. The pertaining paths of the rays 17 and 18, by way of the primary and the secondary mirror 15 and 16, lead to the images of the ground strips as line images 19 and 20 extending perpendicularly with respect to the drawing plane, a ray deflecting system 21 and 22 being in each case arranged at the site of the line images 19 and 20, the ray deflecting system 21 and 22 deflecting image sections of the line image disposed above one another into two respective different directions in space.

Thus, the ray deflecting system 21, for example, consists of a row of mirror strips which are each arranged at a distance from one another and, with their longitudinal axes, are oriented in the direction of the line image 19 and which deflect the path of the rays by 90°. Between the mirror strips, the path of the rays is not deflected so that, in the final analysis, the ray deflecting system 21, divides the line image 19 extending perpendicularly with respect to the drawing plane into a succession of image sections. Optical relay systems of a first group, of which optical relay system 23 is shown, are assigned to one group of image sections. This optical relay system images the pertaining image section on a detector line 24 which is oriented perpendicularly with respect to the drawing plane and which is disposed in the common focal plane of the first group of optical relay systems. Between optical relay system 23 and the assigned detector line 24, an aperture 25 is arranged in such a manner that the above-mentioned telecentric path of the rays is created again. The paths of the rays assigned to the other optical relay systems of the first group extend analogously with respect to the path of the rays shown for optical relay system 23.

Optical relay systems of a second group, of which one optical relay system 26 is shown, are arranged behind the image sections disposed in the gaps between the mirror strips of the ray deflecting system 21. Optical relay system 26 images the image section of the line image 19 assigned to it on its own detector line 27 which, in turn, is arranged in the focal plane which all optical relay systems of the second group have in common, specifically perpendicularly with respect to the drawing plane. In this case also, an aperture 28 is arranged as described above. An analogous situation applies to the other, not shown, optical relay systems of the second group and their paths of the rays.

The path of the rays 18, by way of the primary and the secondary mirror 15 and 16, leads to the imaging of a second ground strip in a line image 20 oriented perpendicularly with respect to the drawing plane, which is also divided into two groups of image sections by another ray deflecting system 22 constructed analogously to ray deflecting system 21. A third and a fourth group of optical relay systems are assigned to these two groups of image sections, only one optical relay system of this group being shown which images the pertaining image sections analogously to the above-described manner on respective separate detector lines.

The line camera shown in FIG. 3 is a stereo version by means of which two parallel ground strips which are disposed away from another by an angle may be taken simultaneously. The imaging takes place perpendicularly with respect to the drawing plane, i.e., in the direction of the ground strips, with a very wide angle.

Figure 4:
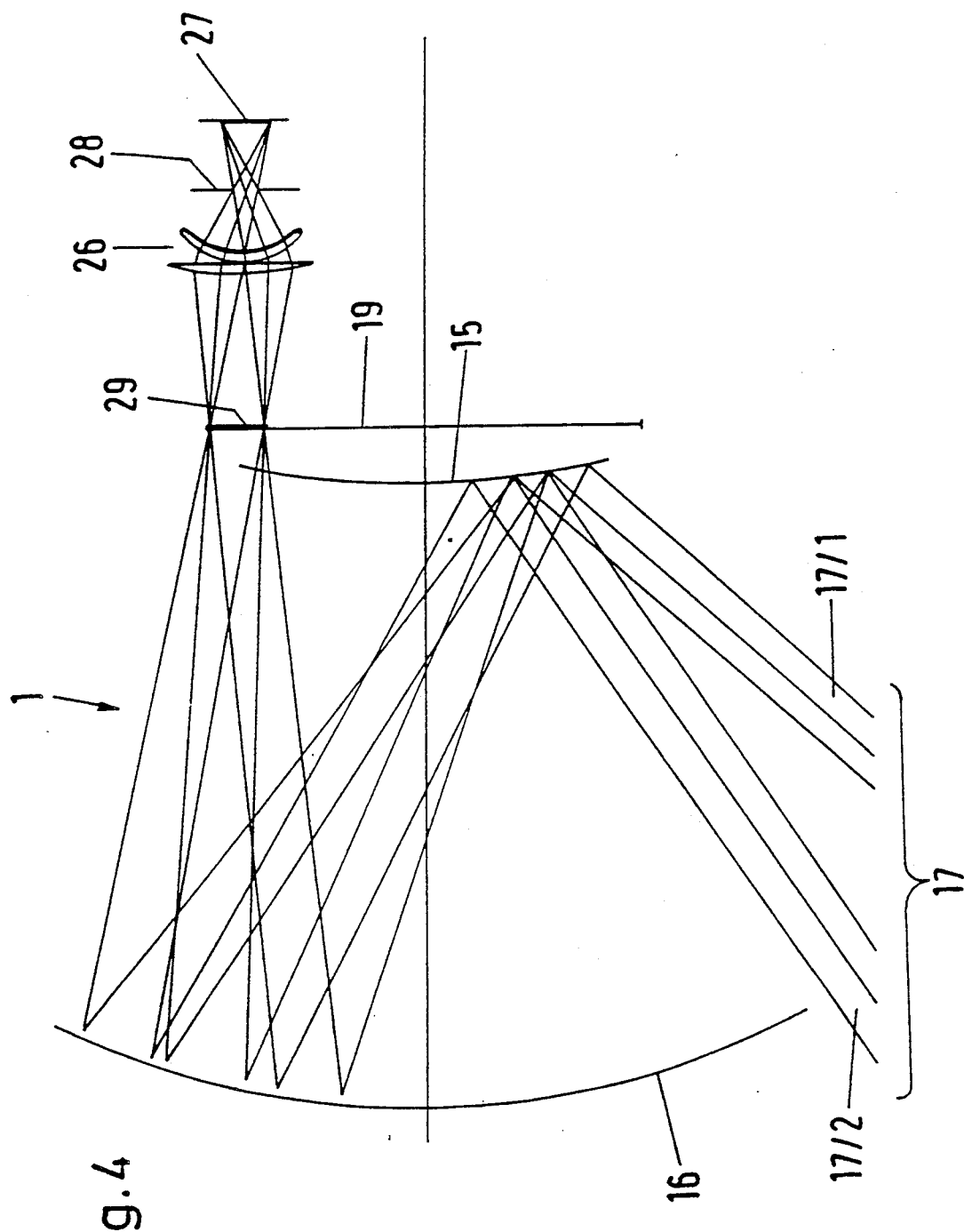
FIG. 4 is a schematic view concerning the embodiment of FIG. 3 of a path of the rays for an image section of the line image.

In FIG. 4, the representation of FIG. 3 is turned by 90°. The image of a part of the ground strip assigned to the path of the rays 17 is represented which corresponds exactly to an image section. Two parallel ray concentrations coming from the edge points of this part of the ground strip are imaged as edge points of the pertaining image section 29 which, at the same time is part of the line image 19 imaging the whole ground strip. The assigned optical relay system 26 plots a picture of this image section 29 on the pertaining detector line 27. The image section, which connects to image section 29 in downward direction, by way of a mirror strip pertaining to the ray deflecting system 21, by way of a path of the rays directed rearward perpendicularly to the drawing plane, is imaged on the pertaining detector line, as shown, for example, in FIG. 3 by means of the path of the rays assigned to the optical relay system 23. The whole line image 19 of FIG. 4 is divided into image sections placed next to one another without any gaps which alternately belong to one of two groups respectively, a group of optical relay systems and detector lines being again assigned to each group. This is not shown in detail in FIG. 4.

Figure 5:
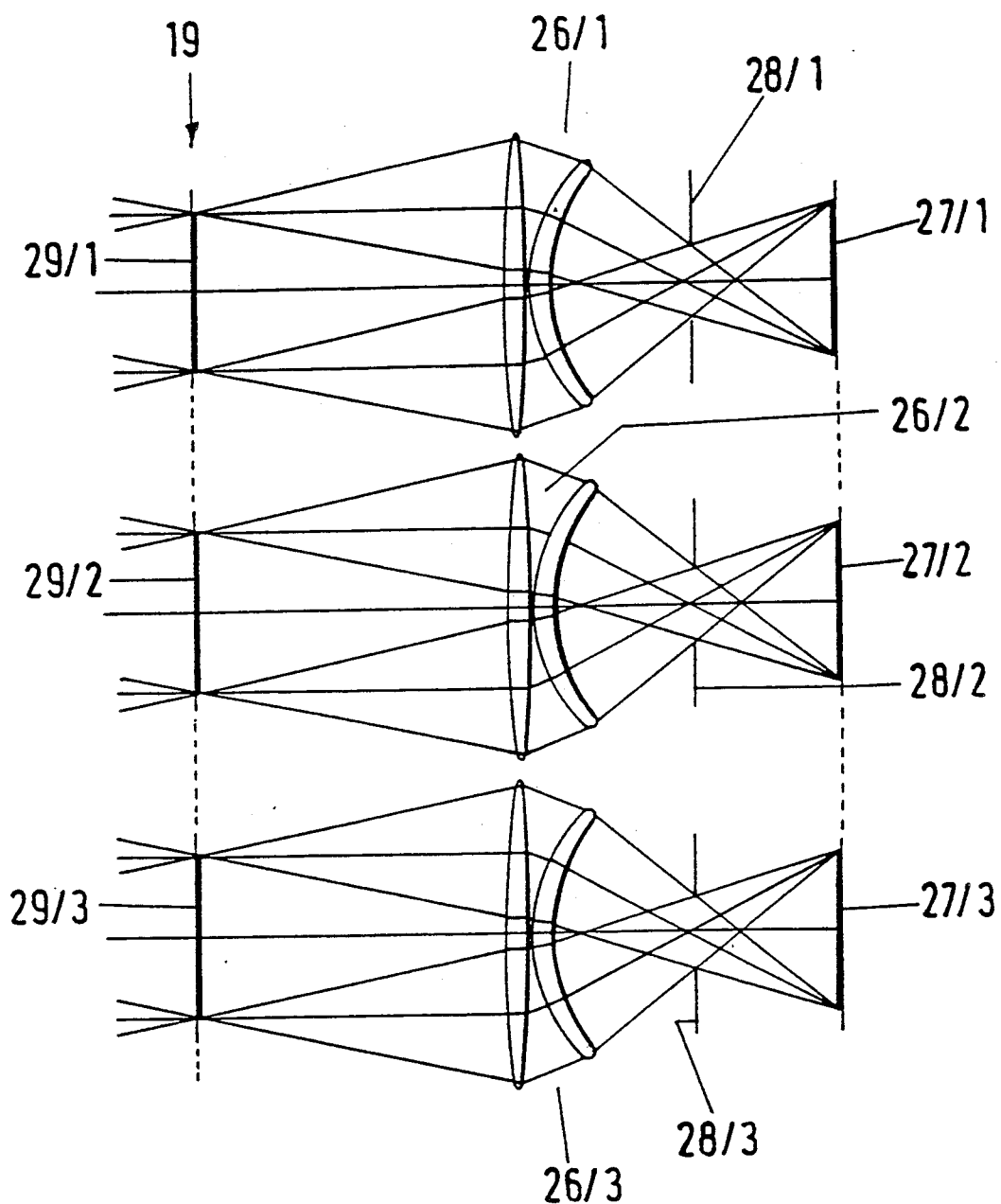
FIG. 5 is a schematic view of a path of the rays with optical relay systems.
Figure 6:
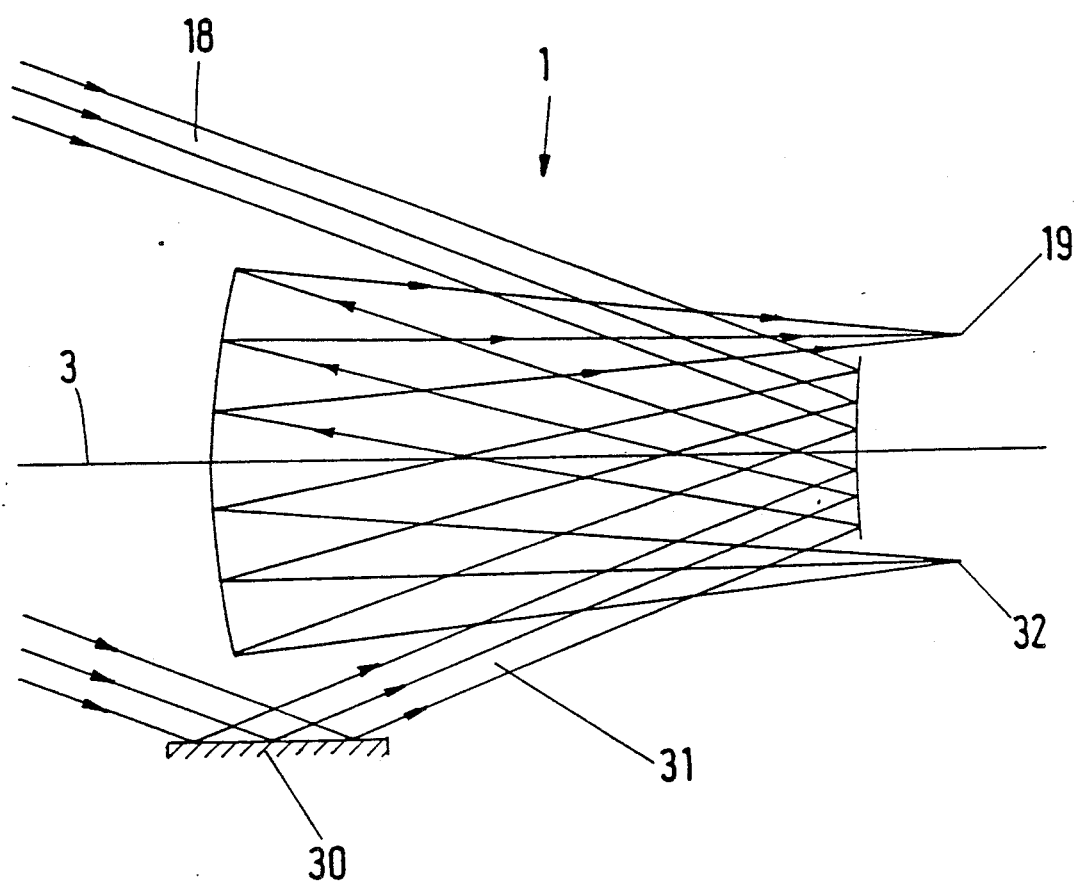
FIG. 6 is a schematic view of an embodiment that is modified with respect to that of FIG. 3.

FIG. 5 is also used for clarifying these facts and shows a cutout from the line image 19, specifically three image sections 29/1 to 29/3 arranged at a distance from one another, as well as the pertaining paths of the rays by mean of which the mentioned image sections, by way of optical relay systems 26/1 to 26/3, are imaged on the respective detector lines 27/1 to 27/3 assigned to each of them. The path of the rays, in turn, is delimited by the screens 28/1 to 28/3. The image sections disposed between the image sections 29/1 and 29/2, etc., by way of the mirror strips of the ray deflecting system 21, are imaged by way of paths of the rays which, perpendicularly with respect to the drawing plane, point rearward, specifically analogously with respect to the path of the rays imaged in FIG. 3 by means of the optical relay system 23.

The ray deflecting systems 21 and 22 are special cases of a ray deflecting system which is composed of several mirror strips which each alternately reflect into another direction in space and extend in the direction of the line image, in which case the succession of the directions in space is repeated several times depending on the number of optical relays systems pertaining to one group. It also contemplate that a line image is divided into more than two groups of image sections to which then more than two different directions in space are assigned. In any case, a separate group of optical relay systems pertains to each individual direction in space which image all image sections assigned to this direction in space on respective separate detector lines situated above one another in a common focal plane.

The objective 1 illustrated in FIGS. 3 and 4 is constructed of mirrors. Naturally this is only one possible special case because naturally the objective may also be composed of lens systems. And vice versa the relay optics may also be composed of a mirror system. The ray deflecting system may also be constructed of beam-splitter type and/or such that it lets none of the paths of the rays pass in an unhindered manner but deflects the paths of the rays of all groups of optical relay systems at the site of the line image into another direction in space. This takes place by means of a correspondingly different orientation of the respective assigned mirror strips.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A line camera for imaging object strips on photosensitive detector lines, having an objective producing a line image of an object strip, having a ray deflecting system situated at the site of the line image by means of which the line image is divided into a plurality of adjacent image sections in such a manner that paths of the rays pertaining to adjacent image sections are directed into respective different directions in space, as well as having an optical relay system arranged optically behind each image section for imaging the respective image section on a respective separate detector line, wherein the total number of the optical relay systems is divided into at least two groups, each group being assigned to another direction in space, the optical relay systems of each individual group each imaging the image sections assigned to them in a common focal plane on their respective separate detector lines which are arranged above one another in the respective focal plane in a line directed in parallel to the line image, and one aperture respectively being arranged between each detector line and the respective optical relay system assigned to it.

2. A line camera according to claim 1, wherein the apertures are arranged such that a path of the rays is obtained which is telecentric for the optical relay systems on the object side and for the objective on the image side.

3. A line camera according t claim 1, wherein the ray deflecting system is composed of at least four mirror strips which alternately deflect into a different direction i space and extend in the direction of the line image, the succession of the directions in space repeating itself at least four times according to the number of optical relay systems pertaining to a group.

4. A line camera according to claim 2, wherein the ray deflecting system is composed of at least four mirror strips which alternately deflect into a different direction in space and extend in the direction of the line image, the succession of the directions in space repeating itself at least four times according to the number of optical relay systems pertaining to a group.

* * * * *